United States Patent [19]

Yamamoto et al.

[11] Patent Number: 4,899,278

[45] Date of Patent: Feb. 6, 1990

[54] AUTOMATIC TRANSMISSION WITH ERRONEOUS SHIFT PREVENTING FUNCTION

[75] Inventors: Masanari Yamamoto; Yasunobu Ito; Kenji Suzuki, all of Anjo, Japan

[73] Assignee: Aisin-Warner Kabushiki Kaisha, Aichi, Japan

[21] Appl. No.: 83,391

[22] Filed: Aug. 10, 1987

[30] Foreign Application Priority Data

Aug. 11, 1986 [JP] Japan ................................. 61-188196

[51] Int. Cl.$^4$ ....................... B60K 41/18; G06F 15/20
[52] U.S. Cl. ..................................... 364/424.1; 74/866
[58] Field of Search ...................... 364/424.1, 565, 569, 364/143; 324/160, 164, 166; 74/866; 377/20, 2; 192/0.033

[56] References Cited

U.S. PATENT DOCUMENTS

| | | | |
|---|---|---|---|
| 4,380,048 | 4/1983 | Kishi et al. | 364/424.1 |
| 4,467,427 | 8/1984 | Magnusson | 364/424.1 |
| 4,584,528 | 4/1986 | Ohmae et al. | 377/20 |
| 4,667,297 | 5/1987 | Kawai | 364/565 |
| 4,683,545 | 6/1987 | Fauvet et al. | 364/565 |
| 4,698,763 | 10/1987 | Smyth | 364/424.1 |

Primary Examiner—Parshotam S. Lall
Assistant Examiner—Christopher L. Makay
Attorney, Agent, or Firm—Varndell Legal Group

[57] ABSTRACT

In accordance with the invention, as shown, for example, in FIG. 1, when a second counter 14 attains a number of pulses n needed for period measurement, the time required for n pulses to enter is obtained from a second memory 16, which stores the time that prevailed n pulses ago, and a first memory 15, which stores the time prevailing when the present velocity signal enters. Vehicle velocity is calculated from the time obtained. A second timer 11 is reset whenever the velocity signal enters in order to check the pulse input time interval. When the value in the second timer 11 exceeds a predetermined value t, the second counter 14 is reset in order to remeasure the time required for the n pulses to enter. Thereafter, the contents of the first memory 15 are stored in the second memory 16 and the second timer 11 is also reset. Accordingly, when the value in the second timer 11 exceeds the predetermined value t, namely when the vehicle is traveling at a very low velocity, the system forgoes the calculation of vehicle velocity. As a result, shift signals are not outputted to the shift solenoids on the basis of a vehicle velocity different from the present vehicle velocity and, hence, an erroneous shift does not take place. The arrangement of the system is a simple one since only the clock signal of the microcomputer is utilized.

6 Claims, 5 Drawing Sheets 4,899,278

AUTOMATIC TRANSMISSION WITH ERRONEOUS SHIFT PREVENTING FUNCTION

BACKGROUND OF THE INVENTION

This invention relates to the prevention of an erroneous shift at a low traveling speed in an automatic transmission having a vehicle velocity sensor for generating a pulsed signal by a rotation sensor.

In a microcomputer-controlled automatic transmission, shifting generally is controlled on the basis of signals from a vehicle velocity sensor and throttle opening sensor. The automatic transmission comprises a well-known group of planetary gears and a friction engagement unit for locking and releasing the elements of the planetary gears. By selectively actuating friction elements automatically in a hydraulic circuit in dependence upon the traveling condition of the vehicle, the vehicle can be made to travel in an optimum speed. On the basis of a combination of on/off signals applied to shift solenoids 1, 2, shown in FIGS. 3 and 4, to energize or de-energize them, the aforementioned friction elements are selectively actuated. More specifically, an electronic control unit (ECU) includes an input signal converting circuit 5, a CPU 6 and a solenoid driver circuit 7. Output signals from a vehicle velocity sensor 3 and a throttle opening sensor 4 are applied to the CPU 6 via the input signal converting circuit 5. The CPU 6 has a memory storing gear-change patterns. gear-change pattern which corresponds to the shift position (e.g. D range or L range) is selected, an optimum speed commensurate with the vehicle velocity and throttle opening is decided on the basis of the selected gear-change pattern, and an appropriate signal is delivered to the solenoid driver circuit 7 to actuate the solenoids 1, 2 accordingly.

With reference to FIG. 5, there is shown an automatic transmission comprising a torque converter T having a lock-up clutch 131 and an output shaft 51, a gear change mechanism 52 coupled to the output shaft 51 of the torque converter T and having three forward speeds and one reverse speed, an overdrive mechanism 53 coupled to the gear change mechanism in parallel relation and having an output shaft 55, and a differential gear 56 coupled to the output shaft 55 of the overdrive mechanism 53.

A first planetary gear mechanism 57 and a second planetary gear mechanism 59 are arranged between the output shaft 51 of the torque converter T and the output shaft 58 of the gear change mechanism 52. A third planetary gear mechanism 60 is arranged on the output shaft 55 of the overdrive mechanism 53. The planetary gear mechanisms 57, 59 and 60 each comprise a sun gear S, a ring gear L and a planetary gear P. These gear mechanisms 57, 59 and 60 also include one-way clutches F1, F2, F3, respectively. A friction engaging unit is provided for engaging and releasing these elements. The friction engaging unit includes multiple-disk clutches C1, C2, C3, a hand brake B1, and multiple-disk brakes B2, B3, B4. As will be described below, gears are shifted for three forward speeds, one reverse speed and overdrive based on which of the friction elements of the friction engaging unit are released or locked.

FIG. 6 is a view illustrating the entirety of a hydraulic control circuit in the above-described automatic transmission. The hydraulic control circuit comprises an oil reservoir 100, an oil pump 101, a primary regulator valve 102, a secondary regulator valve 103, a throttle valve 105, a cut-back valve 106, a manual valve 107, a 2-3 shift valve 109, a 1-2 shift valve 110, a 3-4 shift valve 111, a low-coast modulator valve 112, a second-coast modulator valve 113, a lock-up modulator valve 115, a lock-up control valve 116, a cooler bypass valve 117, a throttle modulator valve 119, an accumulator control valve 120, an exhaust hydraulic pressure relief valve 121, accumulators 122, 123, 125 and 126, solenoids 127, 129 and 130, clutch hydraulic pressure servos C-1, C-2 and C-3, brake hydraulic pressure servos B-1, B-2, B-3 and B-4, the lock-up clutch 131, the torque converter T, oil lines connecting these valves and devices, orifices, flow rate control valves with check valves, and oil strainers.

In operation, working oil drawn up from the oil reservoir 100 by the oil pump 101 is regulated to a predetermined line pressure by the primary regulator valve 102 before being fed into oil lines a and b. The oil in line a is delivered to the secondary regulator valve 103 where it is regulated to a predetermined torque converter pressure, which conforms to the throttle pressure of the throttle valve 105, the lubricant oil pressure and the cooler pressure. A spool in the manual valve 107 connected to the oil line b is moved in dependence upon the shift lever position, namely the P (parking), R (reverse), N (neutral), D (drive), 2 (second) and L (low). As indicated in the table below, the oil line b is communicated with oil lines c, d, e and f in dependence upon the shift position.

TABLE 1

|  | P | R | N | D | S | L |
|---|---|---|---|---|---|---|
| Oil Line c | X | X | X | 0 | 0 | 0 |
| Oil Line d | X | X | X | X | 0 | 0 |
| Oil Line e | X | X | X | X | X | 0 |
| Oil Line f | X | 0 | X | X | X | X |

Operation with regard to each shift position will now be described.

(a) When manual valve 107 is shifted to the D range

As shown in Table 1, the oil lines b and c are communicated to supply line pressure to the clutch C-1, thereby engaging the same. When the vehicle is traveling in first gear, the solenoid valve 129 is ON, the solenoid valve 130 is OFF, the a spool 150 in the 1-2 shift valve 110 is on the left side, the oil lines g, h communicating with the brakes B-1, B-2 are exhausted, and an oil line i communicating with the brake B-3 is also supplied with hydraulic pressure. As a result, the brakes B-1, B-2 and B-3 are released.

When the vehicle velocity surpasses a preset value, the solenoid valve 130 is energized by an output from the microcomputer and the solenoid pressure in line j, which is the control hydraulic pressure of the 1-2 shift solenoid valve 110, falls to a low level, whereby the spool 150 in 1-2 shift valve 110 is moved to the right side so that hydraulic pressure is supplied via oil line c, 1-2 shift valve 110 and oil line h. As a result, the brake B-2 is engaged to effect a shift to second gear. At this time a spool 151 in 3-4 shift valve 111 is fixed on the right side by hydraulic pressure in line k, so that the transmission remains in second gear even when the solenoid valve 130 is energized.

To shift up to third gear, the solenoid valve 129 is deenergized by an output from the microcomputer when vehicle velocity, throttle opening and the like attain predetermined values. A spool 152 in the 2-3 shift valve 109 is moved to the left side to supply hydraulic pressure via the oil line b, 2-3 shift valve 109 and oil line m, thereby engaging the clutch C-2. At the same time, the spool 150 of the 1-2 shift valve 110 is fixed on the right side (on the side for second, third and fourth gear) by line pressure supplied by oil line m.

To shift up to fourth gear, the solenoid valve 130 is deenergized by an output from the microcomputer, as set forth above, so that the hydraulic pressure in oil line j reverts to the high level. The spool 151 of 3-4 shift valve 111 is moved to the left side, the oil line n is exhausted, hydraulic pressure is supplied to the oil line p, brake B-4 is released and clutch C-3 is engaged.

(b) When manual valve 107 is shifted to the 2 range

As shown in Table 1, line pressure is supplied to oil line d in addition to oil line c. A shift to first, second and third gears is performed as in the D range. However, since line pressure is supplied to the 3-4 shift valve 111 via oil line d, 2-3 shift valve 109 and oil line k, the spool 151 is fixed on the right side and a shift to fourth gear does not take place.

If a manual shift from drive (D) to second (2) is performed while the vehicle is traveling in fourth speed and the manual valve 107 is in the D range, line pressure is supplied to the left end of spool 151, as described above, so that the transmission is immediately downshifted to third gear. At the moment the vehicle decelerates down to a predetermined velocity, the solenoid valve 129 is energized by an output from the microcomputer and the transmission is downshifted to second gear. At this time, second-coast modulator pressure is supplied to the brake B-1 via the oil line d, 2-3 shift valve 109, oil line r, second-coast modulator valve 113, 1-2 shift valve 110 and oil line g. As a result, the brake B-1 is slowly engaged so that the vehicle makes the transition to travel in second gear as engine braking is applied.

(c) When the manual valve 107 is shifted to the L range

As shown in Table 1, line pressure is supplied to the oil line e in addition to the oil lines c and d. Second gear is achieved in the same manner as when the manual valve 107 was placed in the D range, and the spool 152 in the 2-3 shift valve 109 is fixed on the right side. In first gear, low-coast modulator pressure is supplied via oil line e, 2-3 shift valve 109, oil line s, low-coast modulator valve 112, oil line t, 1-2 shift valve 110 and oil line i, whereby the brake B-3 is engaged to apply engaging braking and attain first gear.

When the transmission is shifted to the L range while the vehicle is cruising in third gear, line pressure is supplied to the left end of spool 152 from oil line e, as described above, solenoid valve 129 is energized and a downshift is made immediately to second gear. When the vehicle decelerates down to a predetermined velocity, the solenoid valve 130 is energized by an output from the microcomputer and the transmission is shifted down to first gear. The transition to first gear is made with the application of engine braking, as set forth above.

(d) When the manual valve 107 is shifted to the N or P range

As shown in Table 1, line pressure is not supplied to any of oil lines c, d, e and f, solenoid valve 129 is turned ON, and solenoid valve 130 is turned OFF. Line pressure is supplied from oil line j to the lands on the right ends of 1-2 shift valve 110 and 3-4 shift valve 111, the spool 150 is set on the left side (the side for first gear), and the spool 151 is set on the right side (the side for first and third gears) due to line pressure supplied to the land on its right end from oil line h via oil line b and the 2-3 shift valve 109. As a result, line pressure is supplied from oil line b, 3-4 shift valve 11 and oil line n, whereby only brake B-4 is engaged to establish the neutral state.

(e) When manual valve 107 is shifted to the R range

Oil lines b and f are brought into communication, oil lines d and e are exhausted, solenoid 129 is turned ON, and solenoid valve 130 is turned OFF. The spool 152 of the 2-3 shift valve 109 is set to the right side and line pressure is developed in both oil lines m and k. As a result, the spools 150, 151 of the 1-2 shift valve 110 and 3-4 shift valve 111 are both fixed on the right side, whereby clutch C-2 and brakes B-3, B-4 are engaged to achieve the reverse state.

Hydraulic control of the lock-up clutch 131 will now be described.

If the manual valve 107 is shifted to the D, 2 or L range, line pressure is developed in oil line c and the 1-2 shift valve 110 is set on the side for second gear, then pressure is developed in oil line h and line pressure is supplied to the lock-up modulator valve 115. Pressure modulated in the lock-up modulator valve 115 is controlled to a predetermined hydraulic pressure by the solenoid valve 127 and is supplied to the lock-up control valve 116 via an oil line u. On the other hand, the lock-up valve 116 is supplied with secondary pressure received from the secondary regulator valve 103 via an oil line v. Hydraulic pressure controlled in the lock-up control valve 116 is supplied to both sides of the lock-up clutch 131 inside the torque converter T via oil lines x and y. As a result, the torque converter T is controlled so as to operate in a torque converter region, slip region (half-clutched region) or lock-up region.

The operation of the above-described hydraulic pressure control circuit is summarized in the following table:

TABLE 2

|   |     | Solenoid |     |     | Clutch |     |     | Brake |     |     |     | One-Way |     |     |
|---|-----|----|----|----|----|----|----|----|----|----|----|----|----|----|
|   |     | $S_1$ | $S_2$ | $S_3$ | $C_1$ | $C_2$ | $C_3$ | $B_1$ | $B_2$ | $B_3$ | $B_4$ | $F_1$ | $F_2$ | $F_3$ |
| P |     | O | X | X | X | X | X | X | X | X | O | X | X | X |
| R |     | O | X | X | X | O | X | X | X | O | O | X | X | X |
| N |     | O | X | X | X | X | X | X | X | X | O | X | X | X |
| D | 1st | O | X | X | O | X | X | X | X | X | O | X | △ | △ |
|   | 2nd | O | O | ⊙ | O | X | X | X | O | X | O | △ | X | △ |
|   | 3rd | X | O | ⊙ | O | O | X | X | O | X | O | X | X | △ |
|   | 4th | X | X | ⊙ | O | O | O | X | O | X | X | X | X | X |
| 2 | 1st | O | X | X | O | X | X | X | X | X | O | X | △ | △ |
|   | 2nd | O | O | ⊙ | O | X | X | O | O | X | O | △ | X | △ |
|   | 3rd | X | O | ⊙ | O | O | X | O | X | O | X | X | X | △ |
| L | 1st | O | X | X | O | X | X | X | X | O | O | X | △ | △ |
|   | 2nd | O | O | ⊙ | O | X | X | O | O | X | O | △ | X | △ |

In Table 2, the solenoid valves S1, S2, S3 correspond to the aforementioned solenoid valves 129, 130, 127, respectively, the O marks indicate that the solenoid valve is turned ON, that the clutch or brake is engaged or that the one-way clutch is in the locked state, the x marks indicate that the solenoid valve is turned OFF, that the clutch or brake is released or that the one-way clutch is in the freed state, the mark ⊙ indicates that the lock-up clutch is in an engageable state, and the mark △ indicates that the one-way clutch is free when the vehicle is coasting and in the locked up state when the engine is being driven. In 3rd gear of the 2 range, a gear shift is performed at 100 km in order to prevent over-run.

Conventionally, the above-mentioned vehicle velocity sensor can be realized in several ways. One approach is to use a sensor rotor driven by a gear fitted on the output shaft of the transmission. The sensor rotor incorporates a magnet which turns a reed switch on and off to generate a pulsed signal. Another approach is to generate a pulsed signal by a light-shielding plate and photocoupler comprising a combination of a light-emitting diode and phototransistor arranged to oppose each other. However, in a method of measuring vehicle velocity by measuring the period of the signal pulses from the velocity sensor, measurement error is significant when the period of only a single pulse is measured. Accordingly, an average is taken of the periods of a plurality of pulses. This is performed by utilizing a timer in the microcomputer. Specifically, the timer is used to compare time whenever each of a plurality of the pulses elapse, and the average period is obtained based on the elapsed time.

In the conventional vehicle velocity sensing system described above, the capacity (number of digits) of the microcomputer timer is limited. When the vehicle is traveling in an ordinary manner, therefore, measurement is possible within the limits of the timer capacity or number of digits. However, when the vehicle is traveling in a very low velocity region, the periods of the plural pulses exceed the capacity of the timer. If this is expressed by the amount of overflow plus $\alpha$, the predetermined number of digits of the timer are surpassed and an abnormal value is measured. As a result, the microcomputer outputs shift signals to the shift solenoids on the basis of a high vehicle velocity which differs from the present vehicle velocity. This causes an erroneous shift to take place. Though this problem will not occur if the abovementioned abnormal value is subsequently excluded, coping with this situation in terms of softwear is complicated. In particular, when the period is synchronized to the overflow of the timer, the abnormal value appears repeatedly, thus making it even more difficult to cope with the problem as far as software is concerned.

SUMMARY OF THE INVENTION

Accordingly, an object of the present invention is to provide a simple arrangement which excludes the abnormal value of vehicle velocity when the vehicle is traveling at very low velocity.

Another object of the present invention is to prevent an erroneous shift when the vehicle is traveling at very low velocity.

According to the present invention, the foregoing object is attained by providing an automatic transmission with an erroneous shift preventing function in which shift solenoids are controlled by a microcomputer in dependence upon a signal indicative of vehicle velocity and a signal indicative of throttle opening, characterized by having a vehicle velocity sensor for outputting a pulsed signal the period of which varies in dependence upon vehicle velocity, a first timer for measuring time required for a predetermined number of pulses to enter from the vehicle velocity sensor, a second timer for measuring the period of the pulses, and an arithmetic circuit for calculating vehicle velocity based on a value measured by the first timer, and for refraining from calculating the vehicle velocity when a value measured by the second timer exceeds a prescribed value.

In accordance with the invention, as shown, for example, in FIG. 1, when a second counter 14 attains a number of pulses n needed for period measurement, the time required for n pulses to enter is obtained from a second memory 16, which stores the time that prevailed n pulses ago, and a first memory 15, which stores the time prevailing when the present velocity signal enters. Vehicle velocity is calculated from the time obtained. A second timer 11 is reset whenever the velocity signal enters in order to check the pulse input time interval. When the value in the second timer 11 exceeds a predetermined value t, the second counter 14 is reset in order to remeasure the time required for the n pulses to enter. Thereafter, the contents of the first memory 15 are stored in the second memory 16 and the second timer 11 is also reset.

Accordingly, when the value in the second timer 11 exceeds the predetermined value t, namely when the vehicle is traveling at a very low velocity, the system forgoes the calculation of vehicle velocity. As a result, shift signals are not outputted to the shift solenoids on the basis of a vehicle velocity different from the present vehicle velocity and, hence, an erroneous shift does not take place. The arrangement of the system is a simple one since only the clock signal of the microcomputer is utilized.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENT

An embodiment of the present invention will now be described with reference to the drawings.

Figure 1:
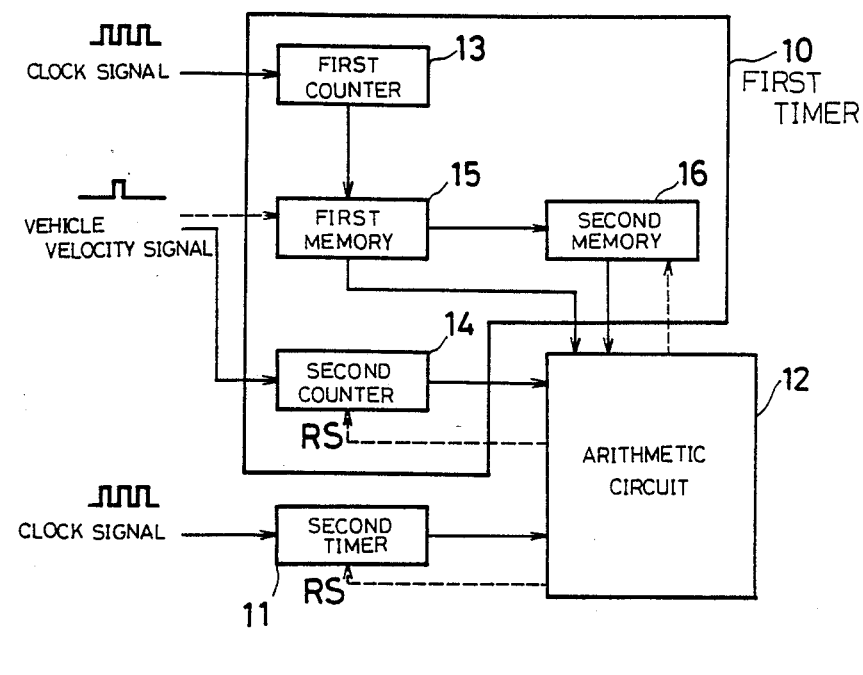
FIG. 1 is a block diagram illustrating an embodiment of a control system of an automatic transmission with an erroneous shift preventing function according to the present invention.
Figure 3:
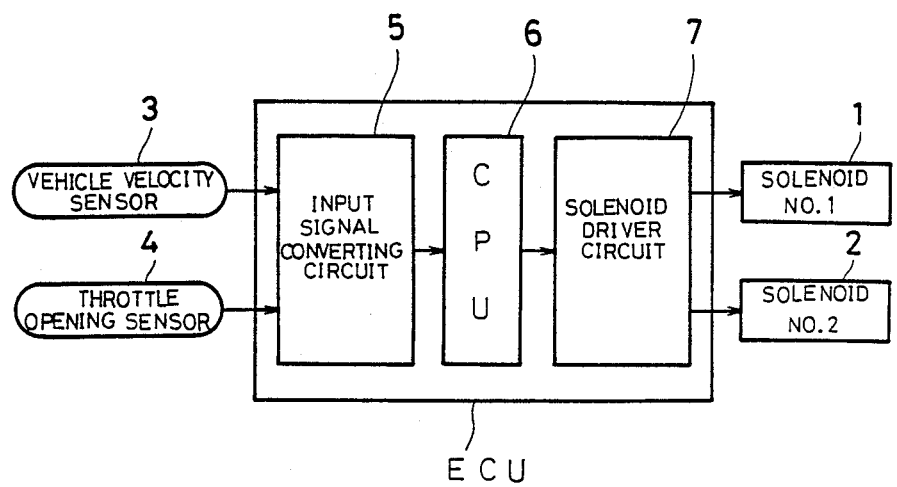
FIG. 3 is a block diagram illustrating a control system of an automatic transmission having a microcomputer.

In FIG. 3, numerals 1, 2 denote shift solenoids, 3 a vehicle velocity sensor, 4 a throttle opening sensor, 5 an input signal converting circuit, 6 a CPU, 7 a solenoid driver circuit. In FIG. 1, numeral 10 denotes a first timer, 11 a second timer, 12 an arithmetic circuit, 13 a first counter, 14 a second counter, 15 a first memory and 16 a second memory.

In FIG. 1, vehicle velocity measurement circuitry constituting the principal portion of the invention comprises the first timer 10 and second timer 11. The first timer 10 comprises the first counter 13 for counting the pulses in the clock signal, the second counter 14 for counting the pulses in the vehicle velocity signal, the first memory 15 for storing the contents (indicative of time) of the first counter 13 when the velocity signal enters, and the second memory 16 for storing the contents of the first memory 15 when the value in the second counter 14 attains a predetermined number n indicative of the velocity signal pulses applied thereto.

Figure 2:
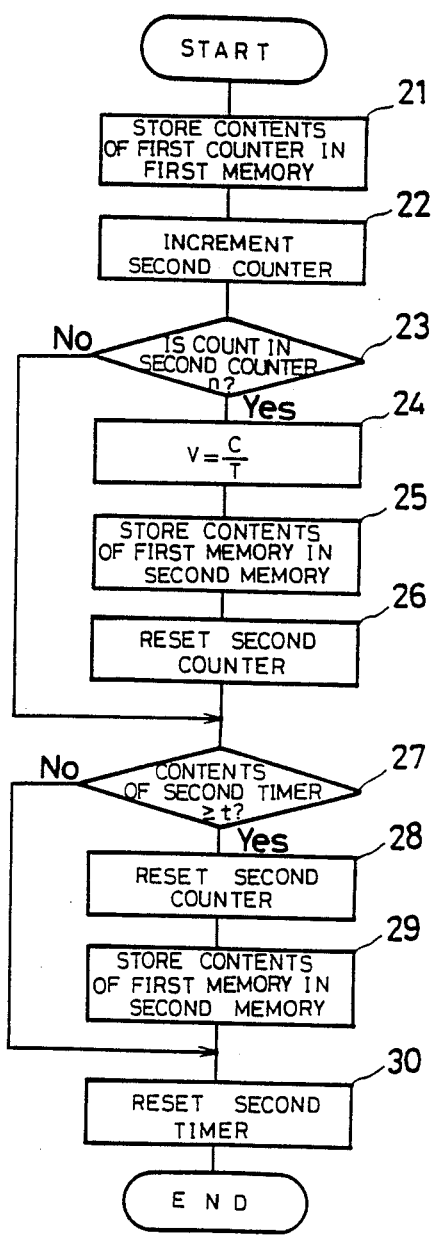
FIG. 2 is a view for describing the flow of processing executed by an arithmetic circuit in FIG. 1.

The flow of processing executed by the arithmetic circuit 12 will now be described with reference to FIG. 2. When the vehicle velocity signal is inputted to the first timer 10 after initial values are set, the count (time) in the first counter 13 is stored in the first memory 15 at a step 21. Next, the count in the second counter 14 is incremented at a step 22. A step 23 calls for a determination as to whether the count in the second counter 14 is equal to the number of pulses n needed for period measurement. If the count in second counter 14 has not attained the value n, the program proceeds to a step 27; if the count has attained the value n, then a time T required for n pulses to enter i obtained from the second memory 16 (initial value =0), which stores the time that prevailed n pulses ago, and the first memory 15, which stores the time prevailing an entry of the present velocity pulse. The vehicle velocity is calculated from the time T (that is, V=C/T, where C is a constant).

In order to calculate vehicle velocity after the next n pulses, the contents of the first memory 15 are stored in the second memory 16 at a step 25, and the second counter 14 is reset at a step 26.

A step 27 calls for a determination as to whether the value in the second timer 11 is equal to or greater than the predetermined value t. The value of t is set to such a time interval that an equivalent velocity signal pulse interval would be considered as indicating that the vehicle is at rest. If the value in the second timer 11 is less than the predetermined value t, then the program proceeds to a step 30, at which the second timer 11 is reset. In other words, the second timer 11 is reset in order to check the input time interval of the pulses whenever the vehicle velocity signal enters. When the value in the second timer 11 exceeds the predetermined value t, the second counter 14 is reset at a step 28 in order to remeasure the time required for the n pulses to enter. Thereafter, the contents of the first memory 15 are stored in the second memory 16 at a step 29, and the second timer 11 is also reset at a step 30. Accordingly, when the value in the second timer 11 exceeds the predetermined value t, namely when the vehicle is traveling at a very low velocity, the velocity of the vehicle is not calculated. All that is performed is remeasurement of the time required for the next n pulses to enter.

Figure 4:
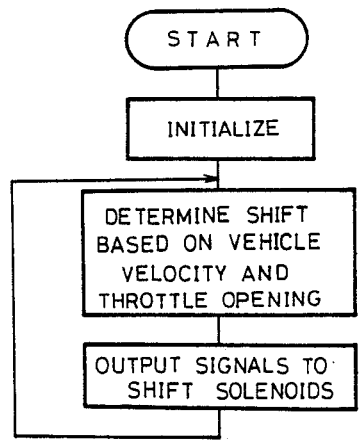
FIG. 4 is a flowchart of processing executed by a CPU in accordance with the invention.
Figure 5:
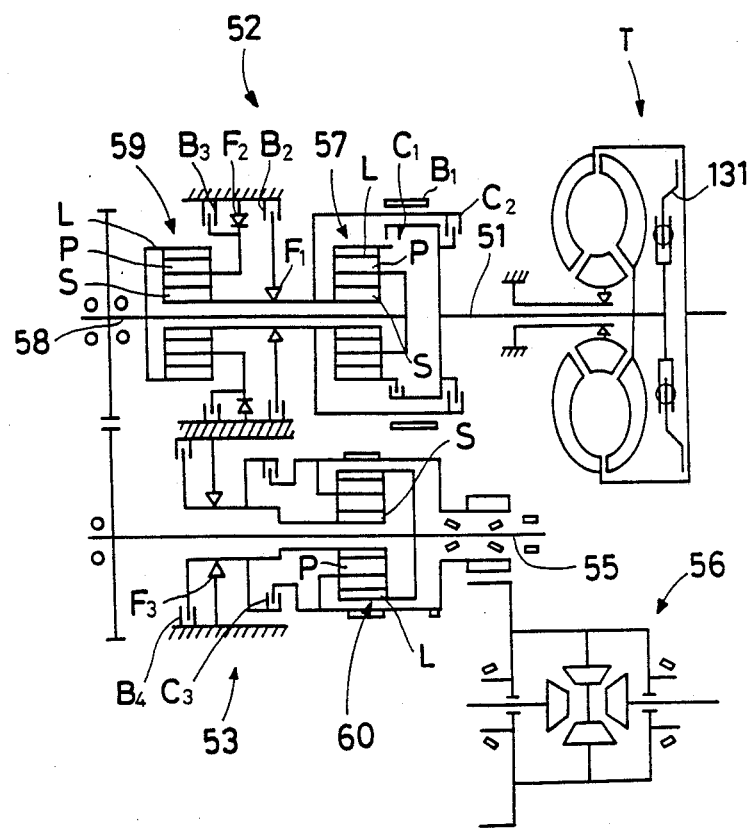
FIG. 5 is a schematic view of a transfer system illustrating one example of an automatic transmission to which the present invention is applied.
Figure 6:
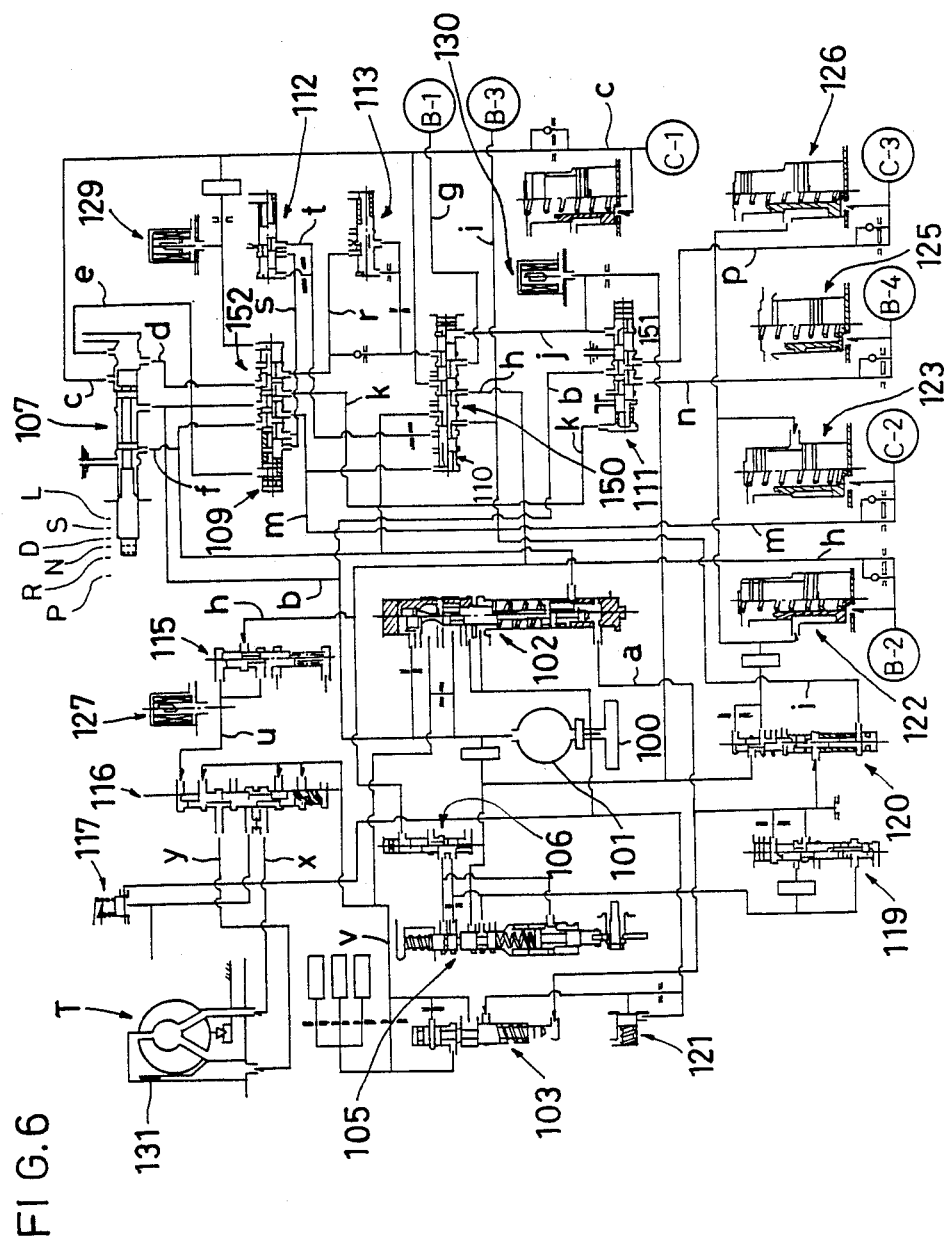
FIG. 6 is a view of a hydraulic circuit of the automatic transmission shown in FIG. 5.

The velocity signal thus obtained is outputted to the control system of FIGS. 3 and 4. The shift solenoids 1, 2 effect a shift to an optimum stage in dependence upon the present traveling velocity and the throttle opening, thereby preventing an erroneous shift when the vehicle is traveling at a very low velocity.

In accordance with the present invention as described above, when the periods of a plurality of pulses surpass the capacity of a timer when the vehicle is traveling at very low velocity, as a result of which we have the amount of overflow plus $\alpha$, it is arranged so that the vehicle velocity will not be calculated by a separate timer. Shift signals will not be applied to the shift solenoids on the basis of a vehicle velocity different from the present vehicle velocity, thereby preventing an erroneous shift from occurring. The arrangement of the system is a simple one since only the clock signal of the microcomputer is utilized.

As many apparently widely different embodiments of the present invention can be made without departing from the spirit and scope thereof, it is to be understood that the invention is not limited to the specific embodiments thereof except as defined in the appended claims.

What we claim is:

1. An automatic transmission with shift solenoids controlled by a microcomputer in dependence upon a signal indicative of vehicle velocity and a signal indicative of throttle opening and having an erroneous shift preventing function at very low speeds, comprising:
   a vehicle velocity sensor for outputting a pulsed signal the period of which varies in dependence upon vehicle velocity;
   a first timer for measuring time required for a predetermined number of pulses to enter from said vehicle velocity sensor;
   a second timer for counting clock pulses; and
   an arithmetic circuit for selectively calculating vehicle velocity and for providing said calculating vehicle velocity to said microcomputer as a vehicle velocity signal for actuating said shift solenoids based on a value measured by said first timer only when a value measured by said second timer is less than a predetermined value indicating very low vehicle velocity.

2. The automatic transmission according to claim 1, wherein said first timer comprises:
   a first counter for counting pulses from said clock signal;
   a second counter for counting pulses from said vehicle velocity sensor;
   a first memory for storing contents of said first counter when said velocity signal enters;
   a second memory for storing contents of said first memory when a value in said second counter attains a predetermined number of said velocity signal pulses applied thereto; and
   wherein vehicle velocity is calculated based upon the contents of said first and second memories when the value in said second counter attains said predetermined number of pulses; and wherein when a value measured by said second timer is equal to or exceeds said predetermined value, said second counter is reset and the contents in said first memory are stored in said second memory.

3. An automatic transmission having an erroneous shift preventing function at very low speeds, comprising:
   shift solenoid means for shifting gears of said transmission,
   a microcomputer means for controlling said shift solenoid means in response to a signal indicative of vehicle velocity and a signal indicative of throttle opening,
   a vehicle velocity sensor capable of outputting a pulsed signal having a frequency of pulses relative to vehicle velocity,
   a first timer means for measuring an amount of time required to receive a predetermined number of pulses from said vehicle velocity sensor,
   a second timer means for measuring a time period between said pulses from said vehicle velocity sensor, and
   arithmetic circuit means for calculating vehicle velocity and for providing said calculated vehicle velocity to said microcomputer as a vehicle velocity signal for actuating said shift solenoids based upon measurements of said first timer means and for discontinuing calculation of vehicle velocity when said time period measured by said second timer is equal to or exceeds a value indicating very low vehicle velocity.

4. The automatic transmission of claim 3, wherein said first timer comprises:
- a first counter for counting pulse signals from said clock signal;
- a second counter for counting pulse signals from said vehicle velocity sensor;
- a first memory for storing contents of said first counter when said pulse signal is received by said first timer; and a second memory for storing contents of said first memory when said second counter receives a predetermined number of pulses from said vehicle velocity sensor; and wherein vehicle velocity is calculated based upon the contents of said first and second memories when said second counter receives said predetermined number of pulses; and when said time period measured by said second timer is equal to or exceeds said value indicating very low vehicle velocity, said second counter is reset and the contents in said first memory are stored in said second memory.

5. The automatic transmission according to claim 2, wherein said second timer is capable of measuring a value indicative of very low vehicle velocity.

6. The automatic transmission according to claim 4, wherein said second timer is capable of measuring a value indicative of very low vehicle velocity.

* * * * *